United States Patent [19]
Walker et al.

[11] 3,961,336
[45] June 1, 1976

[54] ELECTRODE PRINT HEAD

[75] Inventors: John A. Walker; Dimitri S. Dimitri, both of Northridge; Reginald Louis Perkins, Los Angeles, all of Calif.

[73] Assignee: Datametrics Corporation, Van Nuys, Calif.

[22] Filed: May 21, 1975

[21] Appl. No.: 579,460

[52] U.S. Cl.............................. 346/139 C; 29/592; 346/74 S
[51] Int. Cl.².......................................... G01D 15/08
[58] Field of Search........... 346/139 C, 139 R, 74 S, 346/74 SB, 74 SC, 74 EL, 74 EH; 29/592

[56] References Cited
UNITED STATES PATENTS

| | | | |
|---|---|---|---|
| 2,916,343 | 12/1959 | Alden | 346/139 C X |
| 3,267,485 | 8/1966 | Howell et al. | 346/139 C |
| 3,713,168 | 1/1973 | Baker | 346/139 C X |

*Primary Examiner*—Joseph W. Hartary
*Attorney, Agent, or Firm*—Marvin H. Kleinberg

[57] ABSTRACT

An improved printer embodiment that includes a print head having thin "foil" electrodes and associated spacers fashioned to maintain very precisely controlled dimensions and positioning according to specific, improved fabrication techniques providing an exactly oriented row of spaced, aligned electrodes. Each electrode includes an integral "print-finger" adapted to resiliently skid over the passing print-substrate and, preferably, also including a companion contact adapted to engage an associated conductor terminal.

14 Claims, 10 Drawing Figures

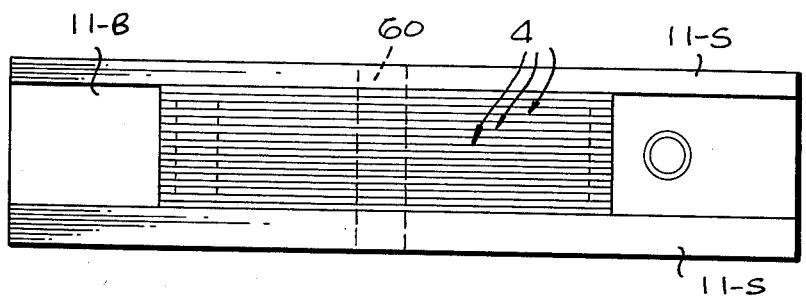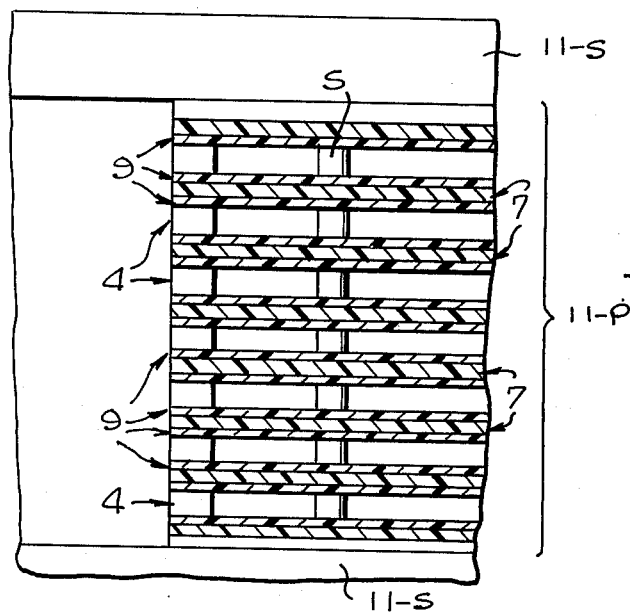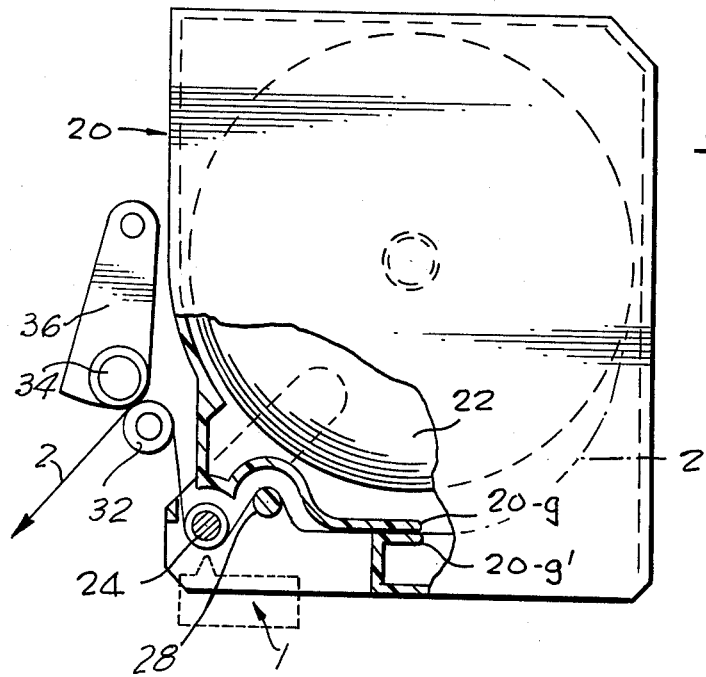

ELECTRODE PRINT HEAD

FIELD OF THE INVENTION

The present invention relates to graphic data output devices and associated fabrication methods; more particularly, it relates to a novel print head such as is apt for use with a strip printer, for example, this head having electrodes fashioned from thin metal sheets according to a prescribed fabrication process.

BACKGROUND OF THE INVENTION

Workers in the art of providing and/or using high speed printers, especially strip printers used for electrographic data processing output, are familiar with the need for simple, light, compact, reliable apparatus, for instance, to be used at remote installations. Workers are being challenged more and more by demands for better reliability, along with reduced size, weight and power requirements and for printing apparatus which is relatively quiet and with fewer moving parts. The present invention is adapted to provide an improved print head and associated fabrication method satisfying such needs, especially as applied to strip printers.

Printers of the type contemplated employ a printing electrode including an arm with a distal marking tip, or stylus, adapted to generate legible print-marks on recording media. Conventional printers requiring inked ribbons and the like are too complex and problematical to operate at the contemplated installations and at speeds required, whereas "electro-sensitive" printers (e.g. spark printers or facsimile electrolytic recorders of the type long employed for recording facsimile images) are commonly considered for such instances. Electrolytic printers employ paper impregnated with an electrolyte, together with a pair of electrodes engaged on opposite sides of the paper, one electrode intended to erode or deplate on the paper surface to thereby create a visible mark thereon. An example of such a technique is described in U.S. Pat. No. 3,713,168 to Baker (commonly assigned) and describing an improved apparatus for making electrolytic media, together with a novel media supply arrangement (relevant portions of this patent being hereby incorporated by reference herein).

In such spark printers and electrolytic printers, one of the electrode elements is commonly skidded over a moving record (paper) surface as the recording electrode stylus, while a ground electrode (typically a grounded metal roller) is engaged on the other side of the record. The subject invention is directed toward an improved print head especially adapted for such printing wherein a foil type electrode-finger is fabricated in a novel manner, being adapted to be resiliently skidded, as the stylus, over the record substrate being selectively energized when recording marks are to be impressed thereby.

For such recording, workers will appreciate that it is all-important to establish and maintain stylus position for accurate, legible printing, especially over extended service life. This is especially so with apparatus like the above-mentioned printers, having a carefully aligned row of such styli electrodes presented across the path of the passing paper strip to selectively impress symbols thereon.

Workers in the art will recognize that such electrodes have heretofore been readily displaced or worn-away in use, or misshapen by record erosion, etc. Such erosion leads to variations in stylus size and/or position, with resultant loss in print quality of course. The present invention provides a method and associated stylus arrangement adapted to meet such problems and provide improved printing without the use of expensive materials and difficulties associated with those commonly used.

SUMMARY OF INVENTION

In accordance with the present invention, an improved print-head assembly and associated fabrication techniques are taught wherein a thin metal foil electrode of a specially chosen material is fabricated according to prescribed, semi-automated techniques. These techniques foster precise, dimensional control, together with mass-fabrication in large groups, economically, of improved print heads. These heads comprise a "foil electrode" combined with associated dielectric spacers, with a number of such spacer-separated electrodes being aligned and joined into a unit to be contained in a retaining structure and so form a print-head assembly.

Preferably, the foil electrodes are formed by chemical etching and are adapted to present a relatively thin, resilient print-arm adapted to resiliently engage the recording medium, being kept in continuous print-enabling contact therewith, yet rugged enough to withstand extensive flexure and use under spark-recording conditions. Such a foil electrode is preferably formed to also include a similar "contact arm", disposed opposite its "print-arm" and functioning in a similar manner to maintain good ohmic contact with an associated rigid conductor.

In a preferred embodiment, the invention is used as part of the print head in a strip printer having a limited number of electrodes adapted for providing print capability comparable to the well-known conventional "stock ticker" type printer.

In other embodiments, such a print head could be adapted to printing a "line-at-a-time" with virtually any type of "electro-sensitive" media such as the recording paper disclosed in the U.S. Pat. to: Weis, U.S. Pat. No. 2,294,146; Ruderfer, U.S. Pat. No. 2,486,985; Ressler, U.S. Pat. No. 2,971,810; Dalton, U.S. Pat. No. 3,048,515; Clark, U.S. Pat. No. 3,138,547; or Reis, U.S. Pat. No. 3,299,433.

The novel features which are believed to be characteristic of this invention will be better understood from the following description of preferred embodiments thereof regarding their manufacture and use, and indicating their fabrication, organization and method of operation. Further objects and advantages will become apparent from consideration of this description in conjunction with the accompanying drawings.

The operation of the present invention will also become apparent from the drawings and specifications which follow in which preferred embodiments are shown and described. It should be noted that the embodiments shown are merely illustrative of forms of the invention and that the invention is not limited thereto. Those skilled in the art appertaining to the invention in the light of teachings herein will contemplate other embodiments within the scope of the appended claims.

BRIEF DESCRIPTION OF THE DRAWINGS

FIG. 4 is a plan view of the assembly of FIG. 3;

FIG. 5 is an enlarged plan view of a portion of the assembly of FIG. 4;

FIG. 7 is a front elevational view, in partial section, of a cassette adapted for attachment to the front face of the print apparatus of FIG. 1, being adapted to supply the paper tape and ground electrode therefor.

DESCRIPTION OF THE PREFERRED EMBODIMENTS

Figure 1:
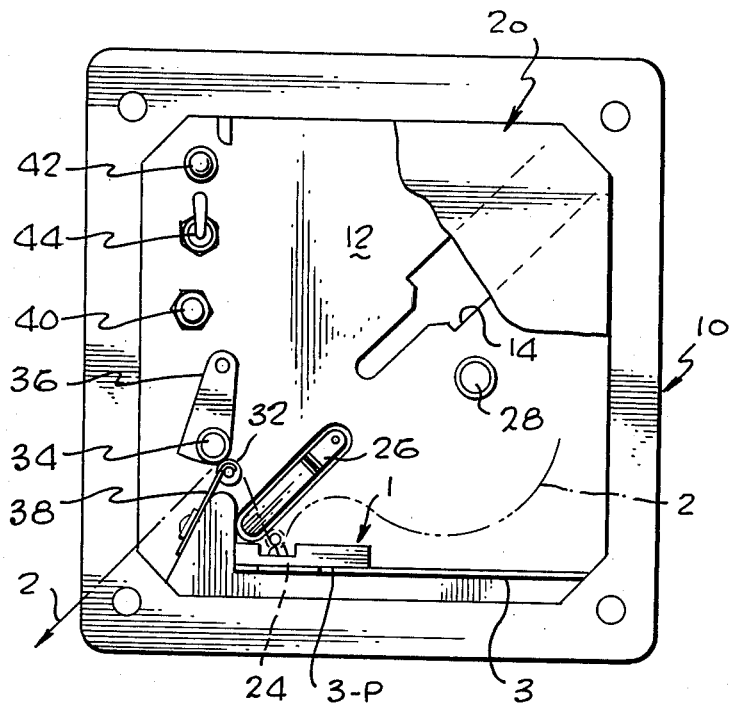
FIG. 1 is a front elevation view of an exemplary strip printer apparatus including a print-head assembly according to the present invention.
Figure 2:
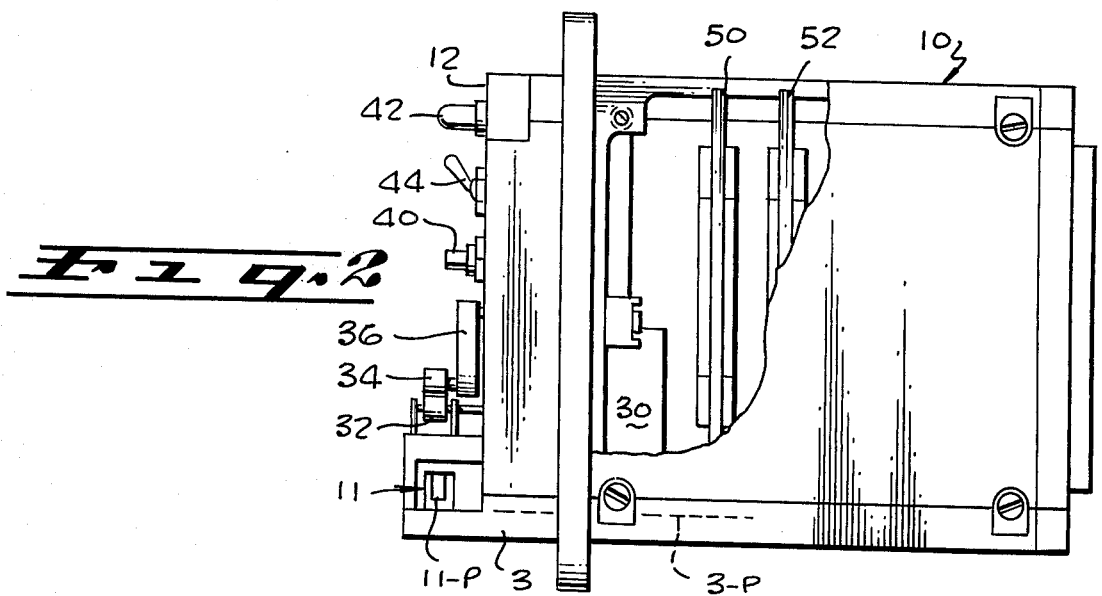
FIG. 2 is a side elevation and partial section view of the printer of FIG. 1.

General Details:

The general configuration of a preferred application for print head embodiments according to the invention is illustrated in FIGS. 1, 2 and 7, where a printer-cassette combination is indicated; i.e., a "spark-recording strip printer" 10 (FIGS. 1, 2) and is provided with a replaceable paper supply cassette 20 (details below; see description of FIG. 7). The cassette 20 includes a spool 22 of recording paper in strip form (strip 2) together with associated guides and also includes a prescribed, built-in rotatable ground electrode roller 24, described below. Strip printer 10 is intended to provide hard copy in a manner well-known in the art and, for instance, resembles the conventional "Stock Ticker", issuing paper strip 2 with data printed thereon in one continuous line, a character at a time.

Printer 10 will be understood as built and operating conventionally, except where indicated otherwise, being adapted to be selectively coupled to a paper-supplying cassette so as to print in a prescribed manner. Here, printing will be exemplarily understood as performed in a "5 × 7 matrix" (it being understood that other print arrays may be used, such as for a plotter) mode with 7 electrodes (5 spaces per character) continually controlled to print on paper strip 2. Strip 2 is typically about ½ inch wide by about 3-6 mils thick with "spark-printing" construction (e.g. having a white conductive top coating with a black substrate underneath, the latter being exposed wherever a spark-printing mark is impressed).

For such an application, a print head 1 is provided, having a row of aligned recording electrodes 4 (see seven such electrodes 4 in FIG. 3), each including a recording tip or stylus 4-S (visible in FIG. 1 as well). The stylus tip 4-S of each electrode is positioned so that when it is selectively energized it will impress a recording mark upon an associated portion of the passing paper strip, with the common roll electrode 24 presented on the opposite side of the strip and appropriately energized, as known in the art. The row of tips 2-S and roller 24 define the "print plane".

Paper strip 2 is advanced in a prescribed incremental fashion past this "print plane", being unwound from a supply spool in cassette 20. This advancement is effected by a paper drive unit comprising drive motor 30, an associated drive spindle and drive roll 32 affixed thereon so as to be rotated by motor 30. An idler roll 34 is mounted to rotate freely on a pivotable arm 36, spring-loaded to thrust idler roll 34 against the drive roll 32, pinching the paper strip 2 therebetween for good, positive engagement during advancement. Motor 30 can be selectively energized to drive the paper strip 2 in increments, or continuously; and it can be controlled either remotely or from circuit boards within the printer, or else it can be selectively advanced under manual control, such as is provided by a "strip advance" push-button 40.

Cassette 20 thus carries recording paper 2 on a spool so as to be pulled and uncoiled therefrom as known in the art. Cassette 20 is adapted to be coupled on the face of printer 10 in prescribed pre-set relation with the "print plane". Strip 2 is adapted to be interposed between the row of print-electrode styli 4-S (see also FIG. 3) and ground roll-electrode 24 in the cassette to spark-print record in a known manner.

When caassette 20 is fitted onto the recording face 12 of printer 10, a guide-fin projecting from the rear of the cassette is registered into a positioning slot 14 in the face. Then, cassette 20 is manually slid down just enough to bring ground electrode 24 into the indicated "print-relation" (FIG. 1) with styli 4-S. The inner end of ground electrode 24 will be understood as electrically coupled to a common ("ground") contact assembly 26, comprising a flexible strip contact.

The registration of this guide fin and accomodating slot, together with the resilient mechanical bias provided by a spring-seated button 28, will be understood to maintain cassette 24, and especially ground electrode 24, in the appropriate print position. Slot 14 thus serves to guide the cassette into print-position and hold it so registered until removed or repositioned manually. That is, this engagement assures that the paper tape 2, will be properly positioned to pass between common electrode roll 24 and styli 4-S. A locking mechanism (not shown but well known) may also be used to hold cassette 20 in place once it is inserted and properly aligned in slot 14 to maintain a predetermined constant pressure between the stylus on the paper, the need for which is known in the art.

The drive spindle, or capstan, 34 carries the rotatable frictional (rubber-covered) drive roll 32 adapted to engage and advance paper strip 2, being driven according to prescribed control signals by drive motor 30 as known in the art. The paper is wound re-entrantly, and held engaged, about a sector of drive roll 32 by the idler assembly, with spring-cocked arm 36 and idler roll 34 holding it so engaged.

Idler roll 34 thus engages paper strip 2, thrusting it against the drive roll 32 as known in the art. In addition, a "doctor blade" mechanism ("peel-off wire") is also mounted to peel and divert the paper strip away from roll 32 and prevent it from being wound therearound, as known in the art. A number of controls and indicators may be understood as provided in association with printer 10 such as indicator ("duty") lamp 42, "On/Off" toggle switch 44 and manual (push button) paper-advance switch 40.

Paper feed control signals will be understood as automatically provided to format the printing and to advance drive roll 32 incrementally. Print control will be understood as provided via respective "print-signals" delivered to the print-electrodes (styli 4-S), being here exemplarily provided through electronic packages 50, 52, etc., as indicated schematically in FIG. 2 (or, alternatively, through auxiliary control units, such as for print control-formatting) as known in the art.

Such printers will be recognized by those skilled in the art as useful for various kinds of printing, especially at remote locations and using various known printing techniques, such as "wet" or "dry" electrolytic, spark-recording or other electro-sensitive techniques. Such printers, when remotely located, should, ideally, exhibit very high reliability, along with diminutive size, low mass and modest power requirements; preferably, they also have little environmental impact; with minimum noxious fumes or any problematic human-audible noise (e.g. a quiet machine is especially necessary for certain applications, whereby "background noise" above a prescribed level, especially of a recognizable nature, is absolutely unacceptable.

Workers in the art will recognize that a spark-recording system of the type described is especially useful for such strip printer applications, being activated by "constant current" signals. These are better able to maintain print uniformity as compared with "constant voltage" signals (e.g. despite changes in humidity, temperature and power, with no substantial effect on print quality). Such "constant current" control is preferable for various reasons, to other electro-printing modes, such as those using a "constant voltage" signal (e.g. in electrolytic printing). For instance, should the paper strip tear, it will not radically disturb or damage the apparatus (.e.g. not "blow" transistors, as a "constant voltage" print unit is apt to), the source being disabled by virtue of an increase in load current, automatically sensed.

Paper Feed:

As mentioned, paper strip 2 is fed from the cassette spool and directed to wind a segment engagingly over drive roll 32, being wrapped therearound in good, substantial areacontact therewith, with idler roll 34 urged by spring-loaded arm 36 thrusting this segment from the opposite side. As best seen in FIG. 7, strip 2 is fed from a supply spool 22 mounted in cassette 20 on a hub, as known in the art, preferably with braking means to compensate for the light load which results when the spool approaches the end of its paper supply.

Strip 2 is guided out of cassette 20 through an exit slot formed by the nip between a pair of flat insulative guide members 20-g, 20-g' molded into the cassette. The upper member 20-g is extended and curved upwardly over a smooth cylindrical guide-bar 28 which diverts the strip upward; the strip is then diverted downwardly, to be wrapped around a substantial portion of ground roll 24. Ground roll 24 is mounted to freely rotate between the walls of cassette 20 and is positioned and adapted as to engage a resilient "ground terminal" strip 26 on the face of printer 10.

Paper strip 2 is then exited from the cassette to engage the drive roll 32, being unspooled thereby. The rate of withdrawal (i.e., advancement past the "print plane") will depend upon how roll 32 is rotated, this being controlled according to the activation of tape drive motor 30. Typically, this withdrawal is controlled by "tape-advance" signals applied to the motor control circuits (as known in the art) or upon operator-actuation with the manual control mentioned.

To maintain optimum legibility, the rate of paper advance must of course, be matched to the spark recording rate, as known by workers in the art. Of course, for low power, long-term, remote, unattended operation, use of a "low-current" printing mode, combined with a relatively "slow" paper advance, will give maximum service life with minimum maintenance. Usually a printer of this sort will be designed for a particular data transmission rate which, in turn, will determine the rate of paper advance and spark recording.

In operation, as drive roll 32 rotates, paper strip 2 will be withdrawn from cassette 20 and passed through the "print-plane" defined between printing styli 4-S and common electrode roll 24. Here, the strip will receive any "print marks" (if any are called for by associated print-instructions). The paper 2 is "print marked" on the side contacting styli 4-S ("surface" spark-recording) and may be viewed and read almost immediately after passing from the nip between rolls 32, 34.

In other embodiments, recognized by those skilled in the art, the rate of paper advance can be controlled in many selected ways to continuously generate print symbols, such as alpha-numeric characters, of different width. For example, the size of individual character symbols can be stretched laterally, by respectively increasing or decreasing the amount of paper advance per dot.

Cassette:

Referring to FIG. 7, cassette 20 will be understood as holding the paper spool and ground-electrode roll 24, as well as providing a prescribed guided path for the paper strip to follow in passing the "print-plane". As a strip is pulled by drive roll 32 about guide bar 28 and ground roll 24, it is kept taut by an appropriate drag mechanism, (not shown but well understood in the art).

Cassette 20 may comprise a molded casing (e.g. of clear, transparent plastic) containing the paper spool, replaceably and rotatably mounted on its spindle between the cassette sides. These sides will be enclosed about their periphery except adjacent the "exit zone" (i.e., feed guides and control electrode 24, etc.), being relieved there to admit the interposition of print head 1 (shown with styli 4-S in phantom, FIG. 7).

Print Head:

While print head 1 is generally apparent in FIGS. 1 and 2, its details are better seen in FIGS. 3 to 5. Here, it will be recognized that head 1 comprises an array (here seven exemplary) of print elements or electrodes 4 formed into a print assembly 11-P which is disposed between the sides 11-S of a holder ("channel") 11, and which also includes insulative shims 9 on either side of each electrode 4, with a spacer 7 between each pair of shims 9. Each print element 4 includes a recording tip (stylus) 4-S and the elements are aligned in a row in print head assembly 11-P, being spaced and electrically insulated from one another to define the mentioned "print plane" (with roll 24). The U-shaped channel structure 11 (best seen in FIGS. 4 and 5) retains assembly 11-P, fixed in place with a positioning rod 60. FIGS. 3 and 5 indicate how each print element 4 is sandwiched between its insulating shims 9, with the shims 9 being spacedapart a prescribed uniform distance by insulating spacers 7.

A 7 × 5 print matrix will be understood here as formed by the seven aligned styli in the direction transverse to the paper motion and five dots in the direction of the paper motion generated by the stepping motor increments.

Details of the print elements (electrodes) 4 will be further described below, but, in general, it will be apparent that each is fashioned from a thin metal "foil" and presents its recording tip 4-S, projected in cantilever-fashion, on a resilient arm 4-P, to be placed in prescribed, preloaded contact with the ground electrode and intermediate paper strip, as known in the art. Arm 4-P thus presents the tip of stylus 4-S at an angle to the medium so as to deliver a desired contact pressure, given a prescribed arm material and cross section.

Arm 4-P is designed to diverge from the body of this thin "foil" electrode at a prescribed divergence angle 4-aa, adapted to apply this contact pressure. The arm 4-P is relatively "straight" along its proximate length P-1, adjacent the point of join with body 4-B. This allows stylus 4-S to pivot principally about a point on the arm, rather than about this point of joinder (and thereby possibly create a point of weakness, vlunerable to fracture or fatigue stress).

Of course, arm 4-P may alternatively be formed in a smooth curve as known in the art, this being readily implemented by the preferred chemical milling process (described below) for forming electrodes 4. The body of each print electrode 4 is centrally relieved by an alignment aperture 4-A adapted to receive rod 60.

Rod 60 establishes the lateral, as well as the vertical, position of the print assembly elements relative to channel 11 (spacers 7, 9 having a like registering aperture 4-A). Once the print elements and spacers are aligned, each with their apertures 4-A in registry, rod 60 may be inserted and affixed to join them.

Positioning rod 60 is important as constituting the heart of the registration-positioning means. The rod 60, is, preferably, frictionally fit into the bores 4-A formed in spacers 7, 9 and electrodes 4, and also projected through a registering bore in the sides 11-S of channel 11, as indicated in FIG. 3, and then held in place by the clamping action of the surrounding channel. Rod 60 may of course be otherwise clamped or held in place, etc. Rod 60 will preferably comprise an acrylic, or like plastic, material and is properly dimensioned (on the order of 60 mils in diameter exemplarily).

The "lower" side of print element 4, opposite stylus 4-S, presents a contact 4-C mounted on an arm 4-G cantileveredout from the electrode body 4-B. Each contact 4-C is intended to resiliently engage a respective registering strip on an adjacent circuit board to thus deliver an energizing "print pulse" to the stylus tip S. Print electrode 4 is comprised preferably of stainless steel, or a like metal. Here, a stainless melt characterized by a tensile strength of about 200,000 psi was found most suitable. Electrode 4 is fashioned, preferably by chemical machining methods, from this metal stock (foil); here, exemplarily about 6 mils thick. The spring contacts 4-C and stylus S exemplarily exhibit on the order of 1 mil deflection per gram bias, here, sufficient for the mentioned continuous contact, thus minimizing tip erosion or distortion.

Stylus arm 4-P is thus formed to exhibit a prescribed cross-sectional thickness and provide a prescribed spring rate so that, with stylus tip S bent back towards body 4-B and preloaded against the ground electrode and intervening recording paper, it will impress the paper strip with a prescribed recording pressure. The spring-arm mounting of stylus S will allow prescribed (positive and negative), resilient excursions of the stylus as it rides over the paper. This will maintain good paper/ground roll contact, while accommodating dimensional or positional variations or misalignment (e.g. of feeding mechanism or print head, of paper thickness), as well as accommodating wear. Here, it has been found that a spring rate on the order of 1 mil deflection (per gram-force), with a total of 10 grams loading on the stylus (as placed for printing) gives quite satisfactory performance. The ordinary contemplated variation in paper thickness will be on the order of 0.25 mil, whereas wear may be expected to allow as much as 10 to 15 mils stylus excursion (before adjustment or replacement).

This "spring-finger" construction of the stylus tip is a significant feature, one found surprising satisfactory for applications like that described where other expedients have failed. One reason is that a properly resilient stylus arm is necessary for various reasons — one being that too rigid a stylus tends to tear the paper (e.g. when the head is mispositioned by only a few mils), as well as wear too much and pick up dirt too readily. The light, resilient stylus-loading avoids this.

As a solution, providing a resilient mount for the entire head has been considered, but this is unsatisfactory because it cannot adequately accommodate small localized eccentricities in dimension or position of the tape or ground roll; and can induce head-tilt, etc. Also considered was a relatively rigid stylus finger, back-supported with its own individual spring-return; but this was also found unsatisfactory, partly because it could not confine the flexure motion to a "straight-up-and-down" plane. Even the described preferred foil-structure (e.g. FIG. 3-D) with its cantilevered finger was found to exhibit imperfect flexing action unless the surrounding spacers held the main body tightly, surrounding spacers held the main body tightly, yet allowed adequate reciprocatory freedom to its arm. That is, the adjacent spacer material should be cut-out (e.g. as in FIG. 3C) or otherwise accommodated so as not to contact and "blind" this stylus arm (finger) while it is reciprocating.

Of course, the material of electrode 4 comprises a very hard steel such as the indicated stainless (e.g. here specified to have a tensile strength on the order of several hundred thousand psi). The selected material is adapted to not only control and limit stylus wear and deformation (abrasion) under service heat, but to also provide the mentioned flexibility and spring bias. Preferably, the material is also practical to etch in a prescribed reasonable etching time, etc. Such a hard material requires rather hard matching contact surfaces on the printed circuit conducting lines. In this particular embodiment, element 4 preferably has overall dimensions on the order of 0.60 inch by about 0.25 inch (about 0.006 inch thick), with the projected arms 4-P, 4-G being about 20 to 30 mils wide. Alternatively, with other types of printers (e.g. 80 column or 32 column type) a wire-wrap connection may be made.

Stainless steel is preferred for electrodes 4 to optimize resistance to erosion and deformation as the stylus wipes across the moving paper strip medium, as well as because it has good electrical conductivity and is physically strong, even in the face of the extreme heat typically generated during spark-printing. Such a "self-wiping" stylus cannot be made of weaker material, such as soft mild steel, as it is apt to be deformed and deteriorated by the concomitant abrasion and heat. It is also apt to be spread-out at its contact point; and this will, of course, alter its size and pressure characteristics against the recording medium and change the size and/or shape of a "print-mark".

The etching process has been designed to create a stylus tip which is tapered toward its point. As this tip wears, a larger contact area becomes available thereby reducing the wear rate.

Even a "stainless stylus" will be seen to develop oxide on its sides, though its self-wiping contact face is found to be kept relatively clean, maintaining good (low resistance) electrical contact with the recording medium. Material like stainless is also preferred because it is susceptible of chemicalmilling as described below.

Each shim 9 is preferably comprised of a relatively rigid inert dielectric (electrical insulating) material such as modified polyurethane ("Kapton", by DuPont).

It will typically be a few mils thick (here, about 2 mils) and roughly the same overall height and length and shape as the pring element 4. However, each shim is preferably relieved along its upper and lower edges (at cut-out areas 9C, 9-C' respectively) adjacent the respective movable resilient electrode arms (4-P, 4-G) so as to remain out of contact with them whatever their position. Thus, when the shims are compressed closely adjacent the sides of their print-electrode, they will firmly secure it into position, yet will not constrict or interfere with the movement of its stylus arms.

Spacer 7 may be comprised of a similar material like shim 9, and have the same overall dimensions, being thick enough, of course, to provice the appropriate uniform "inter-stylus" spacing (here, on the order of 15 to 16 mils between stylus centers). Spacers 7 may, less preferably, be comprised of a homogeneous mica composite comprised of granulated mica particles homogeneously dispersed and bound in a resin matrix. It is very important, as mentioned below, to make sure that the inter-stylus spacing is very, very precisely established, and then held; it is these spacings that utlimately determine print location; and misalignment can degrade print quality to the point of illegibility.

Thus, the formation of the spacers 7, 9 and print elements 4 must be carried-out using techniques that assure a prescribed uniform thickness for each, with no perceptible protrusions on the sides of any element. For instance, stamping or cutting techniques which leave side-burrs or jagged edges tend to interfere with the necessary precision spacing of styli and are not desirable. For this reason, print elements 4 are preferably formed by "chemical milling" techniques, as described below. Other insulating structural material fabricated to have precisely controlled, uniform thickness dimensions may be used for the shims and spacers as will occur to those skilled in the art. Such material, as with the print electrode material, should be sufficiently rugged to withstand operator handling (e.g. during assembly) as well as withstanding the abrasion and heat generated during printing.

Terminal Connection:

As best seen in FIGS. 1 and 3, the print head assembly 1 is adapted to be engaged against an etched circuit board 3 for signal input, being mounted thereon so that the contact 4-C for each electrode 4 is brought into good, electrical contact with an associated conductive line or strip. These are preferably copper strips, etch-formed in a conventional manner on a copper-clad board. The contact is mounted to be spring-biased against its adjacent strip, thereby coupling the electrical print signals to the associated stylus tip. For this reason, the base 11-B, joining the two sides 11-S of print channel 11, is relieved to accommodate insertion of a ground plane 3-P against these contacts as indicated in FIG. 3. That is, head assembly 11-P (FIG. 5) is inserted through the opening in base 11-B to bring the conductive lines into contact with associated contacts (4-C, FIG. 3-D) on each print electrode 4. In this manner, each conductive line will be efficiently coupled to an associated print electrode so that when a print-signal is provided thereon it may be transferred to the associated stylus tip S to record a mark on the passing strip.

Such a "flush mounting" provides good contact with the respective strip lines; yet doing so quickly and easily, with the resilient biasing of the contacts accommodating a certain amount of positioning-error, manufacturing vagaries and shift during service. Print head 1 can be secured to the printed circuit board with a suitable fastener.

In operation, it will be understood that when a print mark is to be recorded on strip 2, an electrical print signal is supplied to that conductive line which transmits this pulse to the respective electrode 4. The pulse travels through the associated contact 4-C to its respective stylus tip S confronting the record there, with the ground electrode on the opposite side. In spark-printing, the passage of current through (or alternatively along the surface of) the spark-recording medium acts to remove white surface coating at that spot, revealing a relatively dark underlayer — this constituting a "print-mark".

Of course, workers in the art will appreciate that such a novel print electrode structure may also be applicable for other electrical marking techniques requiring application of an electrical signal to a recording surface by one of a set of aligned electrodes. Further, electrode styli such as those indicated may be used for purposes other than recording a print mark; e.g. being used for conductivity-sensing to detect the presence and/or electrical characteristics of the recording paper medium as known in the art. Some such electrodes may do this exclusively, or in conjunction with printing. For instance, such a detecting electrode can act to energize a detecting circuit to indicate when the paper supply is exhausted. Such an arrangement permits a printer to operate unattended whereby in the absence of paper, an impedance circuit detects a "short" between the stylus and common electrodes and responsively triggers an alarm, etc., with interruption of printing until the paper is supplied. Alternatively, sensing of "record-impedance" which is "too high" may be used to indicate that the recording medium is not present.

Method:

It is a feature of this invention that the printing stylus electrodes such as electrode 4 in FIG. 3 preferably be formed using a prescribed fabrication technique, including a "chemical milling" (i.e., "chemical etching") operation. Generally speaking, this technique is adapted to chemically etch the print electrodes from a thin sheet of stainless steel or like metal "foil". Such a sheet is appropriately thin (here, a few mils) so as to provide an electrode of the type shown and is formed to exhibit carefully controlled dimensions, with no obstructive lateral protrusions, such as burrs, etc. Such protrusions can interfere with the necessary spacing and/or motion of the stylus electrodes, as assembled into a print head. The described technique will be recognized as desirably inexpensive, reliable, easy to perform (and quickly) and readily automated.

By contrast, machining, stamping or casting such a "foil" electrode will leave such burrs, etc. In analogous prior art arrangements, similar electrodes were provided merely in the form of a wire, appropriate shaped, and comprising a hard metal like tungsten-carbide, to maintain its shape under the hot abrasive printing conditions typically experienced in spark recording.

TABLE I

Method of Forming Electrode

The following method of forming ("chemically etching", etc.) a print electrode, like element 4 described above, is preferred, especially for maintaining the required critical lateral dimensions, while yet mass-producing such electrodes. The following enumeration of steps will be understood as merely exemplary and not intended to be complete in every detail, but simply to teach workers familiar with this art a preferred mode of fabrication:

1. Substrate selection, cleaning, handling:

A thin sheet or foil of stainless steel having the aforementioned characteristics is selected and properly cleaned. More particularly, a sheet of "high-carbon" stainless steel is selected to have a certain nominal thickness (here, 6 mils ±0.2). The alloy or melt may be practically identified and characterized by its tensile strength; here, on the order of 220–240 thousand psi (verified by Hardness test).

This sheet is thoroughly scrubbed and degreased, and is then "conversion coated" (by contact with light acid bath, as known in the art) to assure maximum cleanliness. Thereafter, sheets are handled only on their edges and corners, and with rubber gloves.

2. Imaging:

A suitable photo-resist (preferably Kodak-type KMER or the like) is applied to both sides of each such sheet and an exact image of the prescribed electrode shape is projected thereon — on both sides simultaneously and in exact registry — by contact printing, using a matched pair of working negatives. One negative image is printed on each side, being adjusted to hold very precise (front to back) registration (within ½ mil here).

The sheet is then "exposed", developed and rinsed in a conventional manner, with the photoresist being thereafter "set" by baking the sheet for approximately 10 minutes at about 200°F.

3. Chemical machining:

The photo-resist and metal substrate will now be etched-away in the "negative" image areas to leave the finished part. Preferably, an etching chamber capable of simultaneously etching both sides of the sheet is used, together with associated conveyer means and oscillating head arrangement. The etchant preferably comprises an aqueous ferric chloride bath having appropriate chloride concentration, pH, specific gravity (Baume), etc., as known in the art and summarized below. This bath should be "virgin" and unused, preferably, and reasonably "fresh" (prepared no more than about six months prior).

Etch bath:

Baume of 42 to 43 preferably; no other parts should be run through this bath; both sides of the sheet should be etched at the same time, with Baume being tested at least hourly during etching. The etching rate is monitored to assure that material is being removed from both sides at approximately the same prescribed rate; otherwise, side-burrs, misalignment, etc. can result. For instance, a nonuniform etch rate can throw the alignment bore "out-of-true" and cause misregistration of stylus tips.

Preferably, when the sheet has been etched about 50% (about ½ the waste material removed), it is "flipped in both axes" (turned over 180° and "end for end"). When etching is complete, it is rinsed. The remaining resist (on the positive portions) is removed by stripping.

4. Stripping:

The remaining photo-resist, on the positive portions, is now removed with a conventional stripping solution and the electrodes thus formed are subjected to a final cleaning with isopropyl alcohol; then dried with a hot air blast.

RESULTS

Impressive results have been achieved with this technique, forming sets of print electrodes of the type described at the rate of many per hour and at very reasonable cost. Yet dimensional control is held very tightly (e.g. "undercutting" held to no more than about 2.5 mils). This technique allows holding of the mentioned tight dimensional tolerances; it also produces very few problematical lateral protusions, like burrs, and maintains electrode registration (front-back). The method works surprisingly well with such hard metals and leaves the finished unit very "clean."

MODIFIED ELECTRODE

Figure 6:
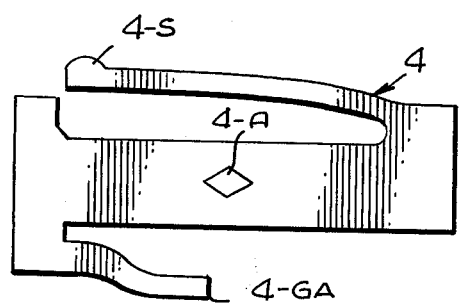
FIG. 6 is a side elevation view of an alternative print electrode embodiment.
Figure 3A:
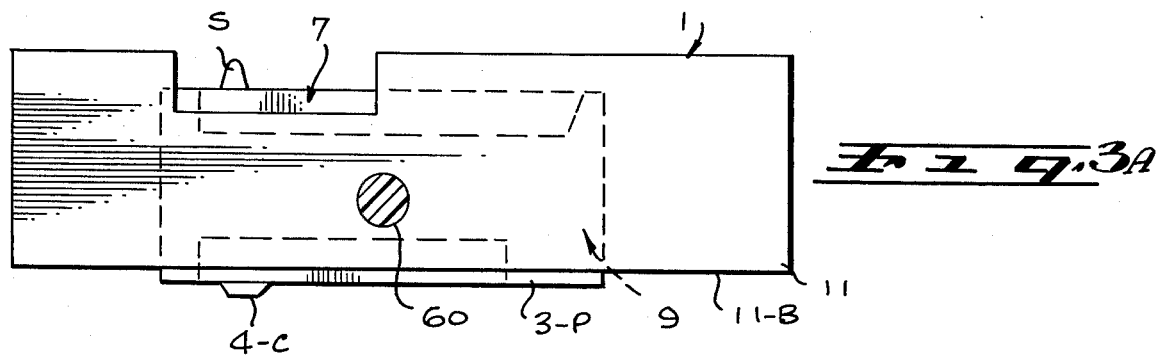
FIG. 3 including FIGS. 3A-3D, inclusive, is an enlarged side elevation view of the print-head assembly embodiment of FIG. 1 with spacer shim and print-electrode elements being exemplarily exploded-away therefrom in FIGS. 3B, 3C, 3D, respectively.
Figure 3B:
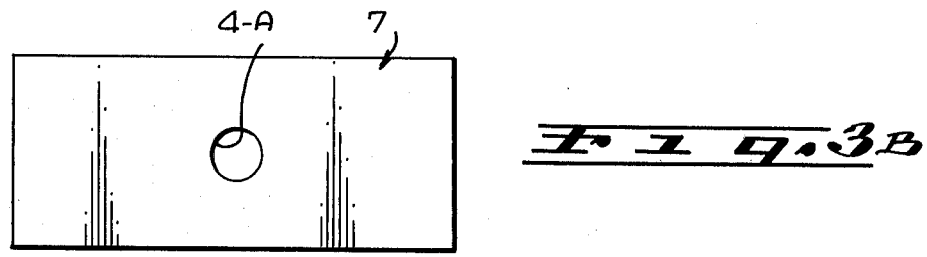
Figure 3C:
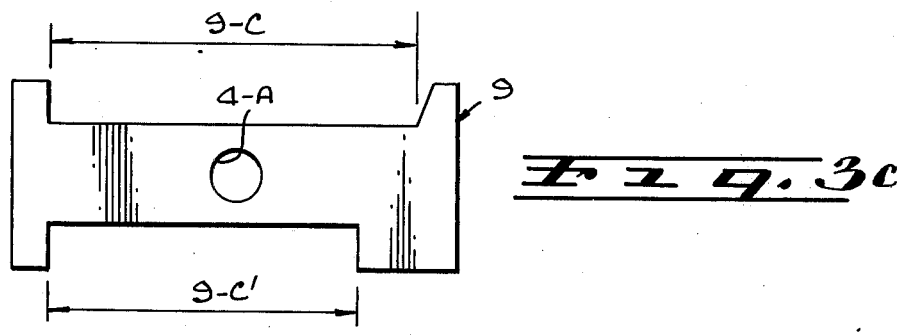
Figure 3D:
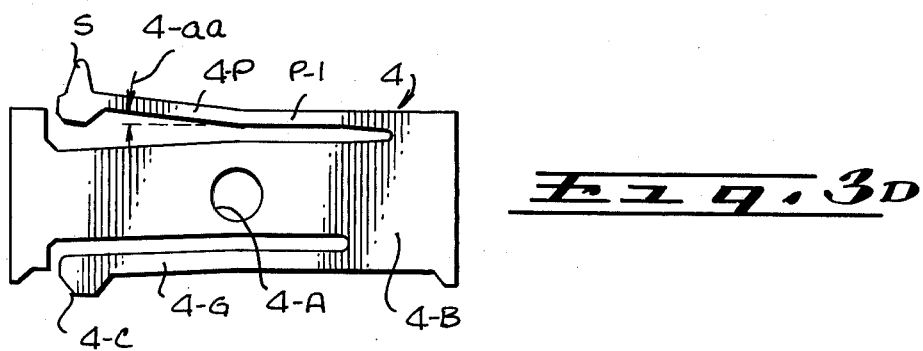

Alternately, the foregoing fabrication method may, of course, be used to make other similar "foil" electrodes; for instance, of the type shown as alternate stylus electrode 4-A in FIG. 6, a structure the same in all respects as electrode 4 (described above) except where mentioned. Here, a stylus recording tip S-A will be understood as projected on a resilient arm 4-PA, cantilevered out from the main body of the electrode on one side, leaving a gap therebetween to allow a prescribed spring excursion of the tip. This tip is somewhat differently formed, being curved less sharply and more gradually to a relatively "high radius" apex designed to "wipe" a recording medium with relatively lower contact pressure. On the opposite side of electrode 4-A is formed a terminal, or contact stub, 4-GA, adapted for wire-wrapping, soldering or otherwise attaching a signal conductor as known in the art. This terminal is spaced from the main body of the electrode but need not be made resilient, as before, for this application. In certain cases a wire wrap attachment will be preferred. Electrode 40-A is centrally relieved by a registration bore Rh-A, similar to bore Rh of the previous embodiment, except that its sides are square rather than round to thus engage the mating sides of the positioning rod and prevent rotation about the center thereof, as understood in the art. Workers will contemplate other like electrode structures apt for manufacture by the described technique and/or for use in like printing devices.

CONCLUSION

While the foregoing has described various embodiments of the invention, it will be understood that the concepts described herein need not be limited by this disclosure, but only by the accompanying claims; and that workers will contemplate other materials, methods and structures than that described for implementing the same claimed concepts, the claims alone limiting the scope of the subject invention.

What is claimed is:

1. An improved print-head assembly comprising a plurality of print-electrode sets separated by separator sheets, each electrode set being comprised of a thin electrode foil having at least one resilient contact arm member cantilevered out from the electrode body so as to accommodate resilient reciprocation toward and away therefrom, plus a pair of thin dielectric sheets each being disposed on one side of said electrode to isolate it electrically and being relieved adjacent each said arm thereof to accommodate the unimpeded reciprocation of the arm;
   each foil electrode being fashioned by selecting a prescribed metal sheet and generating a prescribed print-electrode structure therefrom without introducing any appreciable lateral protrusions on said electrode;
   said array of print-electrodes and associated separation means being mounted in an aligned array and retained so aligned as an integral assembly in a prescribed holder means.

2. A method for providing a print-head assembly having a plurality of print-electrodes, each electrode including at least one resilient contact arm member cantilevered out from the body of the electrode so as to accommodate resilient reciprocation toward and away from the body, said method including the steps of:
   selecting a prescribed thin metal sheet and generating a prescribed print-electrode structure therefrom including said arm member in a manner that introduces no significant lateral protrusions on said electrode;
   sandwiching each said electrode between a pair of non-conductive separating means, each separating means being formed as at least one insulative sheet, and being disposed so as to engage a respective side of the associated print-electrode in a manner not impairing the freedom of reciprocation of said arm member thereof, being securely engaged therewith so as to electrically isolate the electrode from surrounding structure and space it a prescribed distance therefrom; and
   mounting said array of print-electrodes and associated separating means in an aligned array and retaining them so aligned as an integral print-head assembly with aligning means securing the assembly to prescribed holder means.

3. The method of Claim 1 wherein said print electrodes are each chemically machined from thin metal stock several mils thick to comprise an electrode structure.

4. The method as recited in claim 1 wherein said metal sheet comprises hard, tough stainless steel on the order of a few mils thick.

5. A combination as recited in claim 4 wherein said staimless steel is selected to be characterized by a tensile strength on the order of about one hundred thousand to several hundred thousand psi.

6. The method as recited in claim 3 wherein said electrode structure is formed by photographically printing an image thereof on a photo-resist coating on both sides of said sheet, in registry, and then etching-away negative image portions with a prescribed etchant solution, thereafter stripping-away the remaining photo-resist.

7. The method recited in claim 6 wherein said etchant solution comprises an aqueous ferric chloride bath, said etchant being arranged to etch away said negative material relatively uniformly on both sides of said sheet.

8. The combination as recited in claim 1 wherein said print electrode structure is fashioned to comprise an electrode body including a central bore and a print-arm cantilevered-out from one edge of said body so as to present a prescribed, somewhat "pointed" stylus tip adjacent the end of said arm, said arm being spaced from said body at said tip at a prescribed excursion gap, sufficient to provide a prescribed degree of resilient reciprocating freedom for said arm.

9. The method as recited in claim 8 wherein said electrode is also fashioned to be provided with a resilient contact-arm on the edge thereof opposite said print-arm, said contact-arm being adapted to engage associated conductor means in good ohmic contact.

10. The combination as recited in claim 9 wherein said contact arm is constructed and adapted to provide a resilient contact for engagement with a relatively rigid conductor.

11. The method as recited in claim 3 wherein said electrodes and said associated separating means are all provided with registering bores centrally thereof and each comprise an insulator sheet adapted to engage said associated electrode on both sides and being relieved adjacent said reciprocable arms thereof to accommodate nonbinding flexure thereof, plus a separator sheet having a thickness sufficient to establish said spacing distance and adapted to space adjacent electrode-insulator sheet sets; and wherein an alignment rod is thrust through said bores as joined together to form said print-head assembly and affixed in place to maintain said alignment.

12. The combination as recited in claim 11 wherein said holder means further includes a U-shaped channel adapted to receive said print-head assembly so secured in alignment with said rod, the rod being secured thereto.

13. The product resulting from the method of claim 1.

14. The product resulting form the method of claim 12.

* * * * *